US 7,958,360 B2

(12) United States Patent
Lind et al.

(10) Patent No.: US 7,958,360 B2
(45) Date of Patent: Jun. 7, 2011

(54) METHOD AND SYSTEM FOR PERFORMING AN ELECTRONIC SIGNATURE APPROVAL PROCESS

(75) Inventors: Jacob Lind, Roskilde (DK); Jan Lysgaard Jensen, Frederiksberg C (DK)

(73) Assignee: Microsoft Corporation, Redmond, WA (US)

( * ) Notice: Subject to any disclaimer, the term of this patent is extended or adjusted under 35 U.S.C. 154(b) by 1100 days.

(21) Appl. No.: 11/127,518

(22) Filed: May 12, 2005

(65) Prior Publication Data
US 2006/0259962 A1 Nov. 16, 2006

(51) Int. Cl.
*G06F 21/00* (2006.01)
*G06F 21/22* (2006.01)
*G06F 21/24* (2006.01)

(52) U.S. Cl. ........ 713/176; 713/156; 713/157; 713/173; 713/189; 726/19; 726/21; 726/26; 726/30

(58) Field of Classification Search .................. 713/170, 713/176, 152, 155, 165, 166, 167, 168, 171, 713/172, 183; 702/188; 707/102; 726/8, 726/10, 17, 28, 29, 1, 2, 4, 9, 14, 18, 20, 726/21, 26, 27; 705/51, 54, 56, 67, 75, 76; 380/255, 277, 278, 283, 44
See application file for complete search history.

(56) References Cited

U.S. PATENT DOCUMENTS

| 5,315,504 | A | 5/1994 | Lemble | |
|---|---|---|---|---|
| 6,314,434 | B1 * | 11/2001 | Shigemi et al. | 707/695 |
| 6,502,102 | B1 * | 12/2002 | Haswell et al. | 707/102 |
| 6,904,370 | B1 * | 6/2005 | Levinson et al. | 702/19 |
| 7,208,709 | B2 | 4/2007 | Jennings et al. | |
| 7,720,704 | B2 * | 5/2010 | Lind et al. | 705/9 |
| 7,783,885 | B2 * | 8/2010 | Dietl | 713/176 |
| 7,849,101 | B2 * | 12/2010 | Lind et al. | 707/783 |
| 2002/0038424 | A1 * | 3/2002 | Joao et al. | 713/176 |
| 2002/0077785 | A1 * | 6/2002 | Buote et al. | 702/188 |
| 2002/0116642 | A1 * | 8/2002 | Joshi et al. | 713/201 |
| 2003/0018628 | A1 | 1/2003 | Luh | |
| 2003/0093678 | A1 * | 5/2003 | Bowe et al. | 713/180 |
| 2003/0220863 | A1 * | 11/2003 | Holm et al. | 705/37 |

(Continued)

FOREIGN PATENT DOCUMENTS

JP 2000113051 A 4/2000

(Continued)

OTHER PUBLICATIONS

"Microsoft® Business Solutions-Axapta® Production II"; http://www.cherryroad.com/Documents/AXAPTA/ProductionIII_FactSheet.pdf, May 14, 2003.

(Continued)

*Primary Examiner* — Taghi T Arani
*Assistant Examiner* — Kenneth Chang
(74) *Attorney, Agent, or Firm* — Turk IP Law, LLC

(57) ABSTRACT

The present invention includes a computer-implemented method and an Enterprise Resource Planning System (ERP). The method and system allows a user to enable an electronic signature approval process for modification of data in a transaction. The method includes accessing a table that corresponds with the transaction and adding a signature field having a property sheet to the table. The method also includes defining a select property in the property sheet with a select parameter. The select property configured to provide approval of modified data in the transaction upon entry of a valid electronic signature.

14 Claims, 8 Drawing Sheets

U.S. PATENT DOCUMENTS

| | | | |
|---|---|---|---|
| 2004/0093526 A1* | 5/2004 | Hirsch | 713/202 |
| 2004/0111375 A1* | 6/2004 | Johnson | 705/64 |
| 2004/0243260 A1 | 12/2004 | Law et al. | |
| 2004/0250070 A1 | 12/2004 | Wong | |
| 2005/0108537 A1* | 5/2005 | Puri et al. | 713/176 |
| 2005/0132201 A1* | 6/2005 | Pitman et al. | 713/176 |
| 2005/0138382 A1* | 6/2005 | Hougaard et al. | 713/176 |
| 2006/0184865 A1 | 8/2006 | Chakraborty | |

FOREIGN PATENT DOCUMENTS

| | | |
|---|---|---|
| JP | 2004178119 A | 6/2004 |
| WO | WO 2007/067204 A2 | 6/2007 |

OTHER PUBLICATIONS

"MatrixOne Specification Central™"; http://www.matrixone.com/pdf/ds_prod_speccentral.pdf, at least by Feb. 17, 2005.

"Manufacturing challenges of today and how we solve them—the solution for change; controlled by you"; http://www.centerlineerp.com/manufacturing/manufacturingwhitepaper.htm, at least by Feb. 17, 2005.

"Engineering Change Tracking (ECT)", http://www.caelus.com/ect.htm, at least by Feb. 17, 2005.

"bom.com Introduces Powerful, Paperless Product Change Management"; http://www.arenasolutions.com/news/releases/06102002.html, at least by Feb. 17, 2005.

"Reduce cycle time with electronic change management"; http://www.arenasolutions.com/products/features/chngmgmt.html, at least by Feb. 17, 2005.

"ProductCenter™ BOM Editor—Streamlined Bill of Materials (BOM) Management with ProductCenter™"; http://www.softech.com/products/productcenter/pdfs/datasheets/prc_ccs-bom.pdf, at least by Feb. 17, 2005.

* cited by examiner

*-618*

| Database log - Table: 266, R-mill-1, Milling machine no 1 | | | | | | | |
|---|---|---|---|---|---|---|---|
| Overview | History | | | | | | Clean up log |
| | | | | *620* Field name | *622* Value | *624* Previous value | Reinsert |
| Type of ch... | Time | Date | U... | | | | Refresh |
| Insert | 19:14:47 | 01-04-2005 | Admin | WrkCtrGroupId | G-W-center | 0 | |
| Update | 19:14:48 | 01-04-2005 | Admin | WrkCtrId | R-mill-1 | 0 | |
| Update | 19:15:29 | 01-04-2005 | Admin | Name | Milling machineno1 | 0 | |
| | | | | WrkCtrType | Machine | 0 | |
| | | | | WrkCtrNumOf | | | |
| | | | | EffectivityPct | 100,000 | 0 | |
| | | | | OperationSchedPct | 50,000 | 0 | |
| | | | | Capacity | | | |
| | | | | CapUnit | | | |
| | | | | VenId | | | |
| | | | | AccountWrkCtrIssue | | | |
| | | | | AccountWIPValuation | | | |
| | | | | Created | 01-04-2005 | 0 | |
| | | | | QueueTimeBefore | | | |
| | | | | SetupTime | | | |
| | | | | ProcessTime | | | |
| | | | | ProcessPerQty | 1,00 | 0 | |
| | | | | TranspTime | | | |
| | | | | QueueTimeAfter | | | |
| | | | | OverlapQty | | | |
| | | | | ToHours | 1,00 | 0 | |
| | | | | ErrorPct | | | |
| | | | | SetupCategoryId | | | |
| | | | | ProcessCategoryId | | | |
| | | | | Dimension[1] | | | |
| | | | | Dimension[2] | | | |
| | | | | Dimension[3] | | | |
| | | | | IsGroup | | | |
| | | | | AccountWIPIssue | | | |
| | | | | EmplId | | | |
| | | | | CalendarId | Std | 0 | |

FIG. 6

| Modification of resource | | | | | | | | |
|---|---|---|---|---|---|---|---|---|
| Overview | | | | | | | | Transactions |
| | Machine name | Active user ID | Signature user ID | Signer name | Date | Time | Process description | Signature ID |
| ▶ | PC3401-JLIND | Admin | Admin | Administrator | 01-04-2005 | 18:35:05 | Modificaiton of resource | |
| | PC3401-JLIND | Admin | Admin | Administrator | 01-04-2005 | 19:14:47 | Modificaiton of resource | ES-001 |
| | PC3401-JLIND | Admin | Admin | Administrator | 01-04-2005 | 19:15:29 | Modificaiton of resource | ES-002 |

METHOD AND SYSTEM FOR PERFORMING AN ELECTRONIC SIGNATURE APPROVAL PROCESS

CROSS-REFERENCE TO RELATED APPLICATIONS

Reference is hereby made to the following co-pending and commonly assigned patent applications: U.S. application Ser. No. 11/127,464, filed May 12, 2005, entitled "ENTERPRISE RESOURCE PLANNING SYSTEM AND METHOD FOR MANAGING BILL OF MATERIAL TRANSACTIONS"; U.S. application Ser. No. 11/127,527, filed May 12, 2005, entitled "ENTERPRISE RESOURCE PLANNING SYSTEM AND METHOD FOR MANAGING ROUTE TRANSACTIONS" and U.S. application Ser. No. 11/127,595, filed May 12, 2005, entitled METHOD AND SYSTEM FOR ENABLING AN ELECTRONIC SIGNATURE APPROVAL PROCESS.

BACKGROUND OF THE INVENTION

The present invention generally relates to computerized Enterprise Resource Planning (ERP) systems. More particularly, the present invention relates to an electronic signature approval process for approving modifications to transactions or documents in an ERP system.

Enterprise resource planning (or ERP) is a phrase used to describe a broad set of activities supported by multi-module application software that helps a manufacturer or other business manage the important parts of its business. Computerized ERP systems typically handle the logistics of various activity modules internal to a business or organization, such as manufacturing, production, distribution, inventory, shipping, invoicing, accounting and human resource management. Often, an ERP system uses or is integrated with a relational database system. An example of an ERP system is Microsoft® Business Solutions-Axapta®.

Each activity module managed by an ERP system includes transactions or documents. Transactions or documents include information or data that describes processes that occur internal to a business or organization. Many businesses, such as those in the pharmaceutical or biomedical industries, have certain processes that are critical processes and need to be approved before they can be implemented as an activity of the business. Such critical processes are highly regulated by the Food and Drug Administration (FDA) and require that implementation of new processes and modifications to processes as well as deletions of processes are signed off by a representative or multiple representatives of the pharmaceutical or biomedical business.

Generally, information related to a critical process is stored in the ERP system in the form of a transaction or document. To approve such a process or a modification to a process, the document is printed out and manually signed and dated by an individual or multiple individuals who are allowed to make such approvals. The document is then stored in a safe place that is readily available such that copies can be made of the approved document. For example, if the document requiring approval is a manufacturing drawing or a process of how a product is developed then a working copy of the originally signed document can be made for those needing to complete a specific job shown or discussed in the document. After the job is complete, the working copy is destroyed such that only one original exists.

This manual approval process ensures a history or audit trail that describes the lifecycle of data by storing old versions of an approved document as well as storing modified versions of a document. However, such a paper trail is difficult to manage. Original documents can easily become misplaced. To ensure that the history of critical data is fully documented, keeping and storing additional copies of the original documents is practiced, thus creating more problems with respect to managing paper trails.

SUMMARY OF THE INVENTION

The present invention includes a computer-implemented method of enabling an electronic signature approval process for modification of data in a transaction of an Enterprise Resource Planning System (ERP). The method includes accessing a table that corresponds with the transaction and adding a signature field having a property sheet to the table. The method also includes defining a select property in the property sheet with a select parameter. The select property is configured to provide approval of modified data in the transaction upon entry of a valid electronic signature.

The present invention also includes an ERP system having a plurality of transactions. The ERP system is configured to allow a user to enable an electronic signature approval process for modifying data in each of the plurality of transactions. The ERP system includes a table configured to be accessed by the user. The table corresponds to one of the plurality of transactions. The ERP system includes a signature field having a property sheet. The signature field is added to the table by the user. The ERP also includes a select property included in the property sheet. The select property is defined with a select parameter such that it provides approval of modified data in the transaction upon entry of a valid electronic signature.

BRIEF DESCRIPTION OF THE DRAWINGS

FIG. 6 illustrates a screenshot of a second tab form of the database log illustrated in FIG. 5 in accordance with an embodiment of the present invention.

FIG. 7 illustrates a screenshot of a signature log in accordance with an embodiment of the present invention.

DETAILED DESCRIPTION OF ILLUSTRATIVE EMBODIMENTS

The present invention is described in the context of an Enterprise Resource Planning (ERP) system. The ERP system of the present invention includes an electronic signature approval process where an approver attempts to modify a critical process managed by the ERP system. Critical processes in the ERP system are stored in the form of transactions or documents. The present invention is also described in the context of a user enabling the electronic approval process. Before describing aspects of the present invention, however, it may be useful to describe suitable computing environments that can incorporate and benefit from these aspects.

Figure 1:
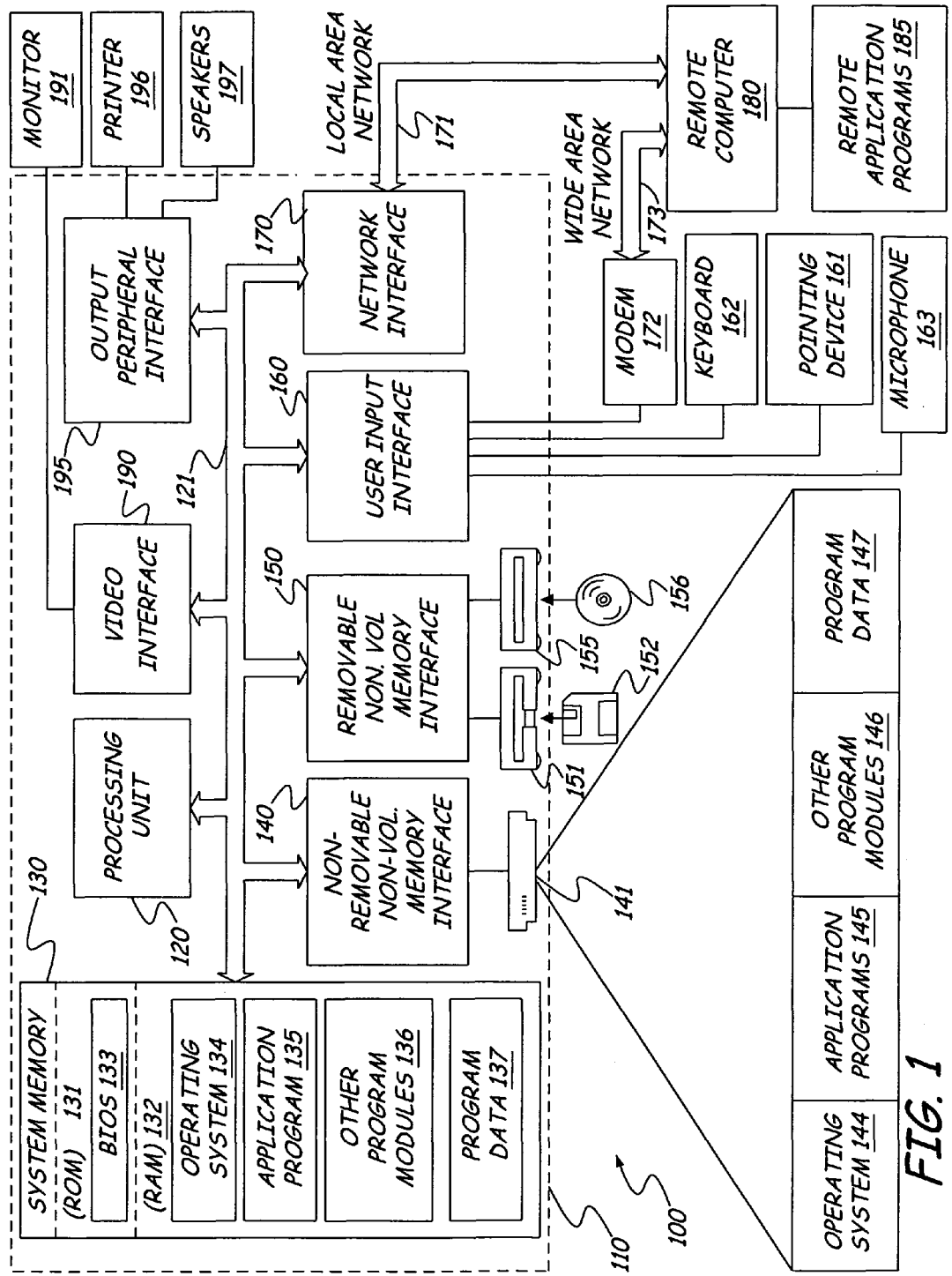
FIG. 1 illustrates a block diagram of a general computing environment in which the present invention can be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
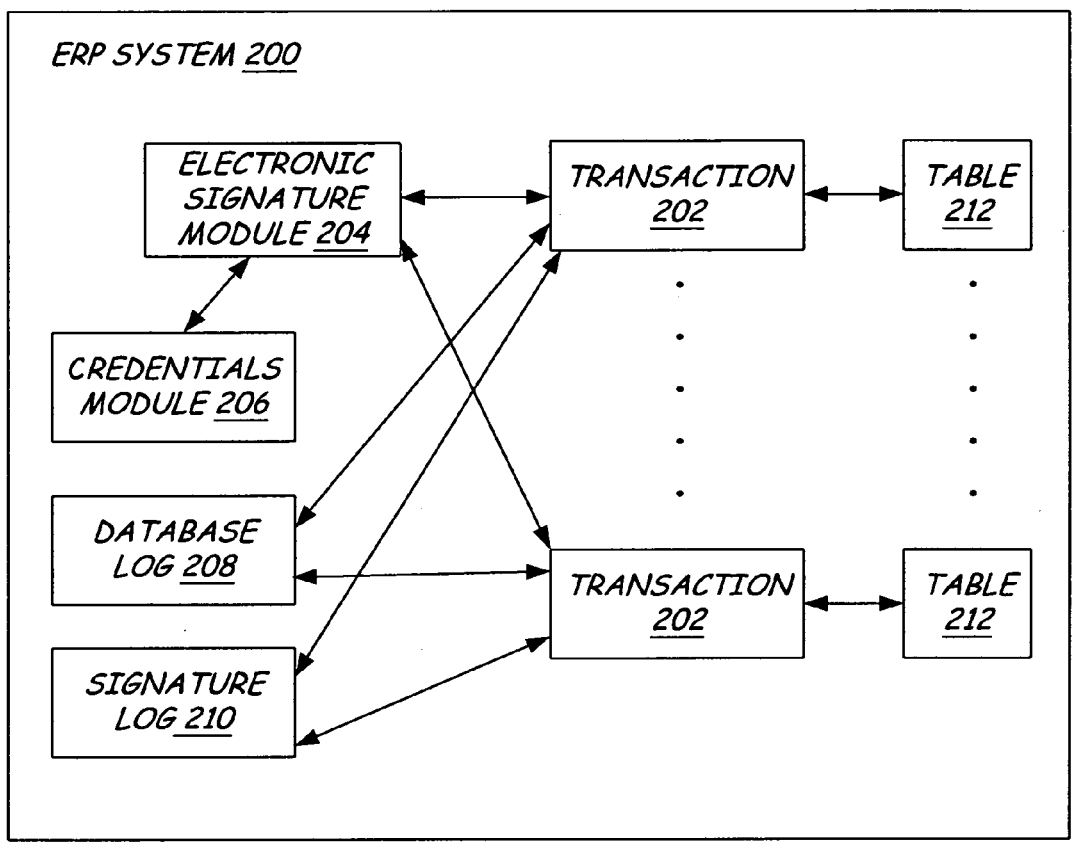
FIG. 2 illustrates a block diagram of an Enterprise Resource Planning (ERP) system in accordance with an embodiment of the present invention.
Figure 3:
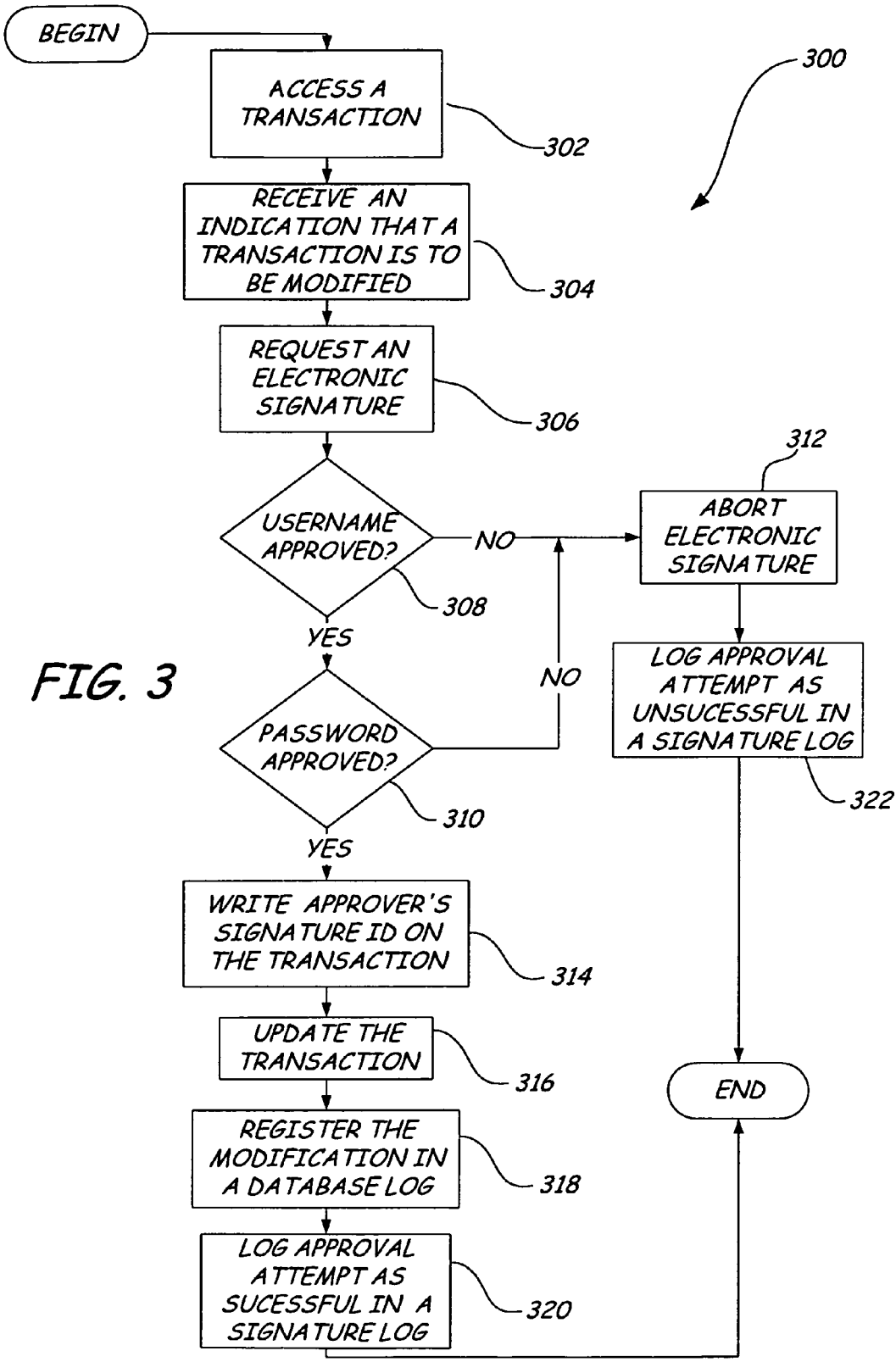
FIG. 3 is a flowchart illustrating a method of performing an electronic signature approval process in accordance with an embodiment of the present invention.

FIG. 2 illustrates a block diagram of an ERP system 200 in accordance with an embodiment of the present invention. FIG. 3 is a flowchart 300 illustrating a method of performing an electronic signature approval process in ERP system 200 in accordance with an embodiment of the present invention. In one embodiment, the approval process illustrated in FIG. 3 is directed towards approving modification of data in a transaction that requires a single electronic signature.

The method begins at block 302. At block 302, ERP system 200 accesses a transaction or document from a plurality of transactions 202. Each transaction 202 includes information or data related to a process that occurs internal to a business and managed by ERP system 200.

In one example, ERP system 200 manages a business's production. Many transactions in the ERP system are categorized as transactions relating to specific aspects of production. Example transactions include production resource transactions. A production resource transaction includes data or information about a resource that is being used in manufacturing. An example resource is a milling machine. In such an example, the milling machine resource transaction includes data indicating how long it takes the milling machine to operate or data indicating the maximum amount of units the milling machine can machine (i.e. capacity). It should be noted that other data is also included in production resource transactions.

In another example, ERP system 200 manages a business's manufacturing. Manufacturing includes many transactions that include data related to manufacture. One such transaction is a bill of materials (BOM). The BOM includes a list of materials that is required to make a particular product. Another such transaction is a route. The route includes data or information of how to use the BOM to make a particular product.

At block 304, ERP system 200 receives an indication that a piece of data in the accessed transaction 202 is to be modified. Modifications include additions, deletions or changes to data. Upon such an indication, ERP system 200 passes to block 306 and an electronic signature module 204 requests an approver to electronically sign the transaction in order to perform the indicated modification. Electronic signature module 204 requests an electronic signature by using an electronic signature form. The electronic signature form or window requires the entry of the approver's username and password.

Figures 4, 5:
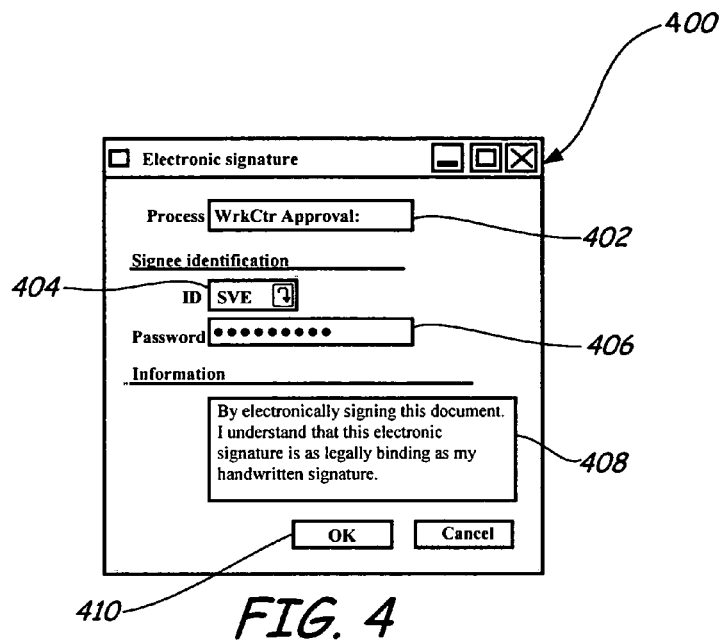
FIG. 4 illustrates a screenshot of an example electronic signature form in accordance with an embodiment of the present invention.
FIG. 5 illustrates a screenshot of a first tab form of a database log in accordance with an embodiment of the present invention.

FIG. 4 illustrates a screenshot of an example electronic signature form 400 used for requesting an electronic signature in accordance with an embodiment of the present invention. Electronic signature form 400 solicits an approver's username and password to approve modifications to a transaction. In FIG. 4, the transaction, which is to be approved, is indicated in process name block 402. In the example illustrated in FIG. 4, an electronic signature is requested for the approval of a production resource transaction. The production resource transaction is known as a Work Center in ERP system 200. In particular, the production resource is milling machine number 1. At username field 404, an approver is asked to enter a valid username. In the example illustrated in FIG. 4, the approver's username is SVE. Although the approver's username can be selectable from a plurality of usernames, the approver's username can also be keyed into username field 404. At password field 406, the approver is asked to enter a valid password. Electronic signature form 400 also includes an information block 408. Information block 408 provides an alert indicating that by electronically signing the document, the approver understands that the electronic signature is as legally binding as the approver's handwritten signature. After the approver has entered their username and password, the approver selects the okay field 410 such that electronic signature module 204 will begin processing the approver's information.

Referring back to FIGS. 2 and 3, electronic signature module 204 processes the username and password by accessing credentials module 206. Credentials module 206 compares the username and password to a list of acceptable usernames and corresponding passwords. Such a module is well known in the art of authentication and, in one embodiment of the present invention, credentials module 206 is used to validate the electronic signature such that modifications can be made to transaction 202. However, credentials module 206 is also configured to validate a user signing into an instance of ERP system 200. Such a sharing of credentials module 206 between electronic signature module 204 and an instance of an application of the ERP system makes user memorization of a username and a password simpler. There are additional advantages. For example, a user can be signed into an instance of ERP system 200 and a different user or approver can electronically sign a modification to a transaction without being particularly signed into ERP system 200.

At block 308, electronic signature module 204 verifies whether the username supplied, for example in username field 404 illustrated in FIG. 4, is a valid username for approving the specific process. If the username is valid, ERP system 200 proceeds to block 310. If, however, the username is invalid, ERP system 200 proceeds to block 312. At block 312 the electronic signature approval process is aborted. At block 310, electronic signature module verifies whether the password supplied, for example in password field 406 illustrated in FIG. 4, is a valid password for the given username. If the password is valid, ERP system 200 proceeds to block 314. If, however, the password is invalid, ERP system 200 proceeds to block 312. As discussed above, at block 312, the electronic signature approval process is aborted.

At block 314, the approver's username and password have been verified and ERP system 200 writes a signature identification (ID) that corresponds with the verified approver on accessed transaction 202. The signature ID indicates which approver has electronically signed or approved modifications to transaction 202. ERP system 200 proceeds to block 316 and updates the transaction with the modified data. At block 318, ERP system 200 registers the modified data in a database log 208. Database log 208 is a tracking system that is configured to log modifications of information or data in any given transaction, for example in transaction 202. In one embodiment, database log 208 can be configured to log changes to only specific information in a transaction. However, logging changes only to specific information does not comply with FDA regulations. Therefore, in another embodiment, database log 208 can also be configured to log modifications of all information or data in a transaction.

FIGS. 5 and 6 illustrate screenshots of database log 208 in accordance with an embodiment of the present invention. As illustrated in FIGS. 5 and 6, the screenshot in FIG. 5 illustrates a first tab view 500, while the screenshot in FIG. 6 illustrates a second tab view 600. First tab view 500 and second tab view 600 illustrate logged data of the transaction that corresponds with production resource milling machine number 1. In FIG. 5, first tab view 500 illustrates an Overview tab 502 of logged modifications to milling machine number 1. Overview tab 502 includes a plurality of columns that categorizes information and describes modification entries that have been made to the particular production resource. Example columns include Name of Table 504, Record Description 506, Type of Change 508, Created Date 510, Created Time 512, Creator Signature ID 514 and Creator Name 516. As illustrated, the transaction, corresponding with milling machine number 1, was created in ERP system 200 on May 19, 2004. On Apr. 1, 2005, the table transaction was modified or updated and electronically signed by the Administrator.

In FIG. 6, second tab view 600 illustrates a history tab 618. History tab 618 shows the actual logged modifications made to milling machine number 1. History tab 618 includes a Field column 620, a Value column 622 and a Previous value column 624. Referring to history tab 618, on Apr. 1, 2005, data in Values column 622 was inserted and updated. History tab 618 also shows that there was no data in Previous values column 622 before database log 208 was updated.

After ERP system 200 registers the modified data into database log 208, the ERP system passes to block 320 in FIG. 3 and logs the approval attempt as being successful in a signature log 210 (FIG. 2). Referring back to block 312, if the electronic signature approval process was aborted, ERP system 200 passes to block 322 and logs the approval attempt as being unsuccessful in signature log 210. Successful attempts are those electronic signature approvals where valid usernames and passwords were used. Unsuccessful attempts are those electronic signature approvals where invalid usernames and/or passwords were used.

All successful and unsuccessful attempts at electronic signature approval are logged in signature log 210 at either block 320 or block 322. FIG. 7 is a screenshot illustrating a view 700 of signature log 210 in accordance with an embodiment of the present invention. View 700 shows each electronic signature approval attempt as a line entry. Signature log 210 includes a plurality of columns that include information describing the different attempts made to electronically approve a process. Example columns include Machine name 702, Active user ID 704, Signature user ID 706, Signer name 708, Date 710, Time 712, Process description 714 and Signature ID 716.

Machine name column 702 includes the name of the computing device that was used to attempt electronic signature approval. As illustrated in FIG. 7, all entries were approval attempts made at the computing device named PC3401-JLIND. Active user ID column 704 includes the username that was used to sign into or open an instance of ERP system 200. As illustrated, all entries were approval attempts made on computing device PC3401-JLIND on an instance of the ERP system that was signed into by the username Admin. Signature user ID column 706 includes the username that was used to attempt electronic signature approval of the resource. In FIG. 7, the Signature user ID column 706 matches the Active user ID column 704. However, as discussed above, the user who is attempting to electronically sign a document need not be the same user who is signed into the current instance of ERP system 200. Signer name column 708 is the name of the user who is attempting to electronically sign a transaction. The name of the user corresponds with the signature user ID. Date column 710 and Time column 712 include the dates and times at which there was an attempt to electronically approve a document. Process description column 714 includes a short description of what modifications were attempted.

Signature ID column 716 includes an alpha-numeric identification code that is associated with a successful attempt at electronically signing a document. The first entry of view 700 does not include a signature ID. The absence of a signature ID indicates that the particular attempt at electronic signature approval was unsuccessful. Therefore an unsuccessful entry is made into the signature log. There can be one of three reasons for an absence of a signature ID. In one aspect, the user trying to electronically sign a transaction is not allowed to do so because the user does not have the proper access rights or credentials to electronically sign the transaction. In another aspect, the user has entered a non-existing username. In yet another aspect, the user trying to electronically sign a transaction has entered the wrong password. The remaining two entries illustrated in FIG. 7 include a signature ID (i.e. ES-001 and ES-002). These two entries were successful attempts at electronically signing a transaction.

Regardless of the reason for an unsuccessful attempt at electronic signature, the unsuccessful attempt can also initiate an email or notification to the administrator. In addition, at any given time a report can be generated based on successful and unsuccessful attempts at electronic signature. For example, reports can be generated that show successful and unsuccessful electronic signature attempts per user or per date. Other types of reports are possible.

In another embodiment of the present invention, multiple electronic signatures can be applied to a transaction for approval of a modification. For example, it is possible that a manager or supervisor of an approver is also required to electronically approve a transaction. To electronically approve a transaction that requires multiple signatures, a first approver's electronic signature is performed in accordance with the method illustrated in FIG. 3. Upon a first approver's successful attempt at electronically approving a transaction, a second approver can attempt to make the same modification to a transaction using the method illustrated in FIG. 3. Upon a successful attempt, ERP system 200 writes the second approver's signature onto the transaction as illustrated in blocks 314, 316, 318 and 320 of FIG. 3.

Figure 8:
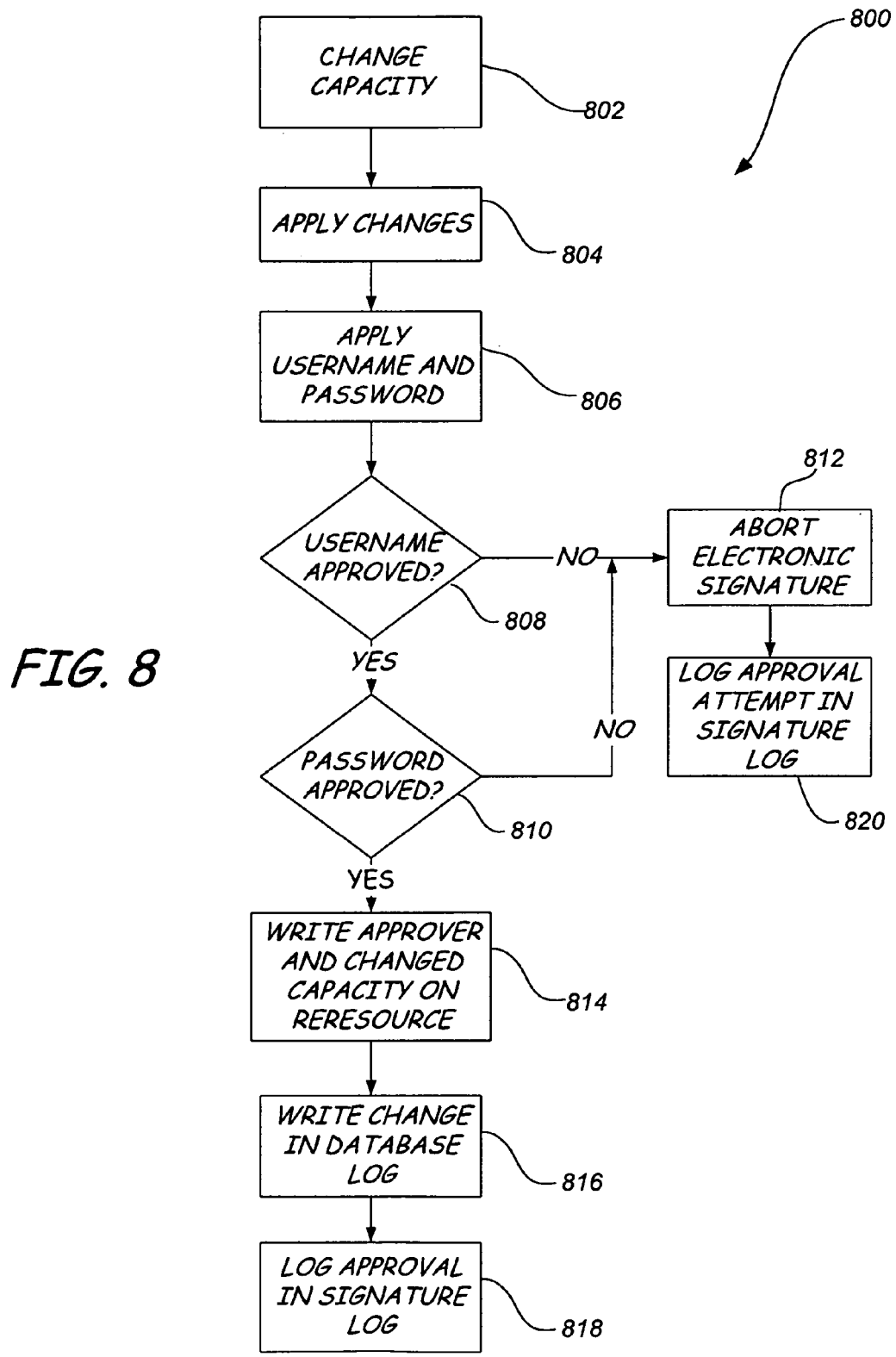
FIG. 8 is a flowchart illustrating an example method of performing an electronic signature approval process for making a change to a production resource in accordance with an embodiment of the present invention.

FIG. 8 is a flowchart 800 illustrating an example method of performing an electronic signature approval process when making a change to a transaction in an ERP system, such as ERP system 200. The example illustrated in FIG. 8 illustrates the steps associated with changing the capacity of a production resource that requires electronic signature approval. More particularly, flowchart 800 illustrates changing the capacity of milling machine number 1 as previously discussed in association with FIGS. 5 and 6.

The method begins at block 802. At block 802, an approver changes the capacity of the production resource and at block 804 applies those changes. To make the change, an electronic signature module, such as electronic signature module 204, requests that the user electronically sign an electronic signature form, such as the form illustrated in FIG. 4. At block 806, the approver applies their electronic signature.

At block 808, the electronic signature module verifies whether the username applied in block 806 is a valid username for approving the specific process to be modified. If the username is valid, the ERP system proceeds to block 810. If, however, the username is invalid, the ERP system proceeds to block 812. At block 812 the electronic signature approval process is aborted. At block 810, the electronic signature module verifies whether the password applied in block 806 is a valid password for the given username. If the password is valid, the ERP system proceeds to block 814. If, however, the password is invalid, the ERP system proceeds to block 812. As discussed above, at block 812, the electronic signature approval process is aborted.

At block 814, the approver's username and password have been verified and the ERP system writes a signature ID that corresponds with the verified approver on the transaction. This signature ID indicates which approver has approved or electronically signed a transaction, such as transaction 202. At block 814, the ERP system also updates the changes to the capacity on the transaction. At block 816, the ERP system registers the changed capacity in a database log, such as database log 208. All successful and unsuccessful attempts at electronic signature approval are logged in a signature log, such as signature log 210, at either block 818 or block 820. The process description associated with either a successful or an unsuccessful attempt at electronic signature approval will include a description that capacity has been changed on the production resource.

Figure 9:
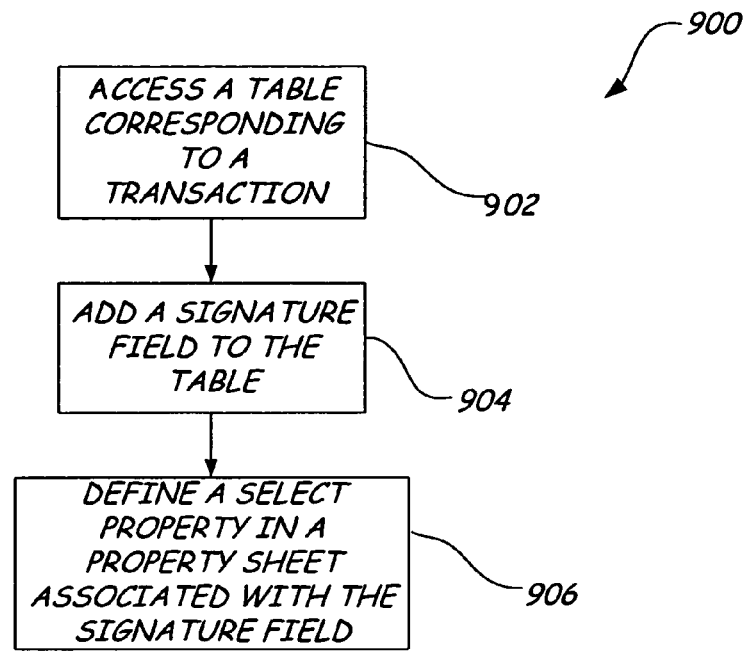
FIG. 9 is a flowchart illustrating a method of enabling an electronic approval process in an ERP system in accordance with an embodiment of the present invention.

FIG. 9 is a flowchart 900 illustrating a method of enabling an electronic approval process in an ERP system, such as ERP system 200 (FIG. 2), in accordance with an embodiment of the present invention. The method illustrated in FIG. 9 is performed in response to user inputs. In one embodiment, enabling an electronic signature for approval of a transaction can require a single electronic signature.

Each transaction, such as transaction 202 illustrated in FIG. 2, includes a corresponding table 212. Referring to FIG. 9, at block 902, table 212 is accessed in response to a first user input. Accessed table 212 includes a plurality of fields that contain data related to corresponding transaction 202. At block 904, a signature field is added to table 212 in response to a second user input in order to begin the process of adding an electronic signature approval process feature to a particular transaction.

Figure 10:
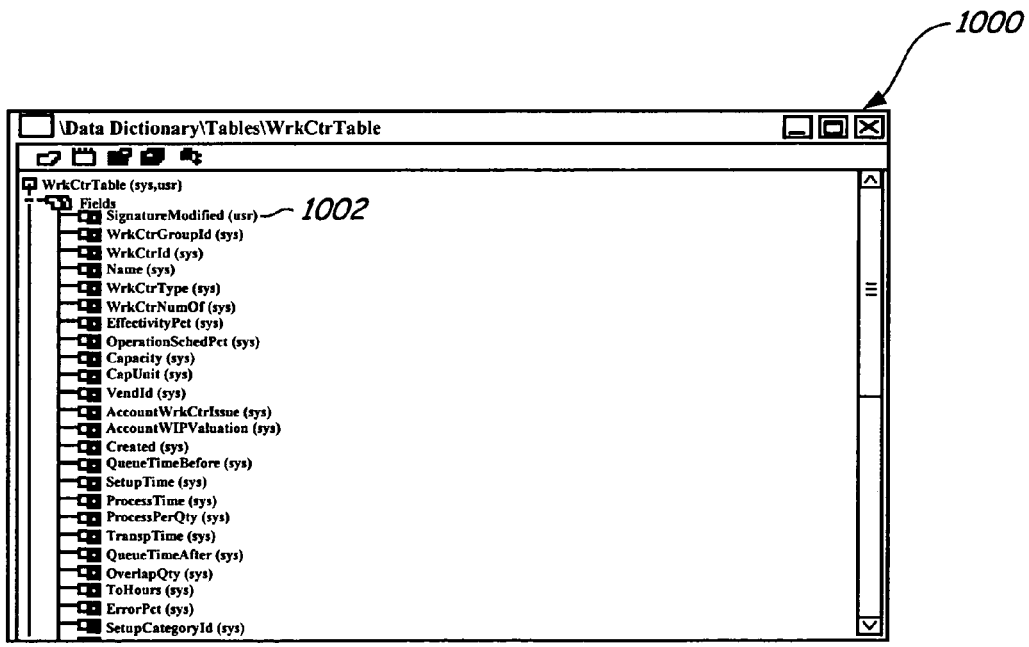
FIG. 10 illustrates a screenshot of a table that corresponds with a transaction in accordance with an embodiment of the present invention.

FIG. 10 is a screenshot illustrating a form 1000 representing table 212 in accordance with an embodiment of the present invention. Form 1000 illustrates that table 212 is a Work Center table. A Work Center table is a table for a production resource. For example, the Work Center table could be for a milling machine (i.e. milling machine number 1) as previously discussed. Those skilled in the art should recognize that other names of tables exist for other types of transactions. As illustrated, a signature field 1002 has been added to table 212 to enable an electronic signature approval process in association with a particular transaction, such as a production resource. Signature field 1002 is named "SignatureModified".

Figure 11:
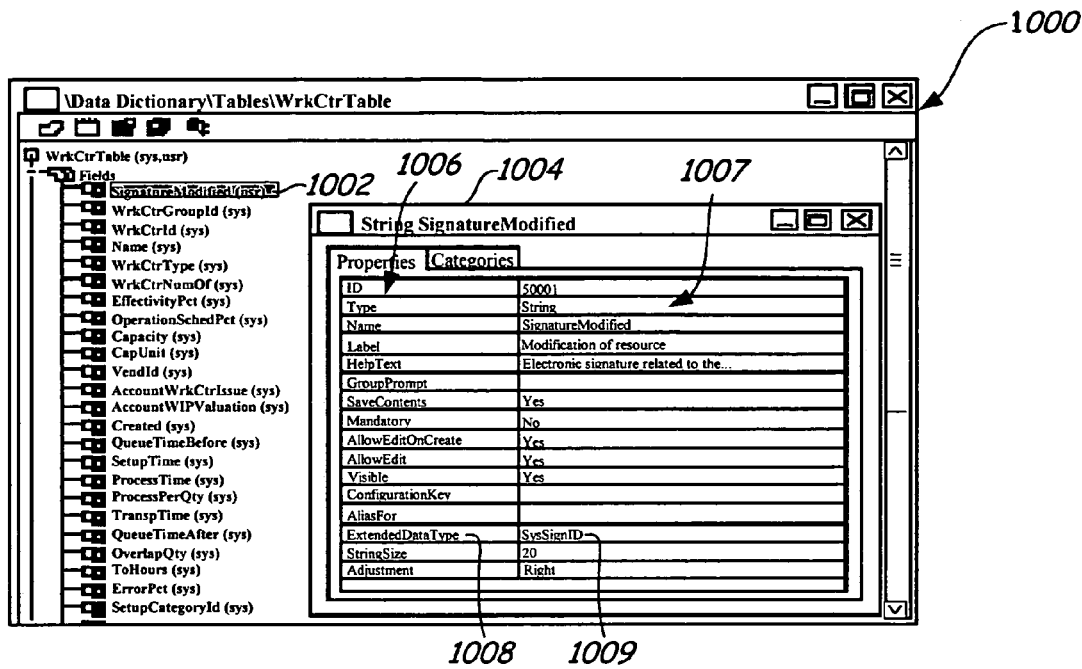
FIG. 11 illustrates a screenshot of the table illustrated in FIG. 10 and including a property sheet in accordance with an embodiment of the present invention.

FIG. 11 is a screenshot illustrating a property sheet 1004 associated with signature field 1002 in accordance with an embodiment of the present invention. Upon adding signature field 1002 to a table, such as a Work Center table, the user is given access, via a property sheet 1004, to a list of properties associated with an electronic signature approval process that is being added to the Work Center table. As illustrated in FIG. 11, signature field 1002 includes a property sheet 1004. Property sheet 1004 includes a plurality of properties 1006 for defining aspects of an electronic signature approval process. Each property 1006 is defined by a parameter 1007.

Referring back to FIG. 9, at block 906, a select property in property sheet 1004 is defined by a select parameter in response to a third user input. As illustrated in FIG. 11, the select property to be defined is property 1008 or the "ExtendedDataType". In FIG. 11, the user defines select property 1008 with the select parameter 1009, such as the parameter "SysSignID". The defined select property 1009 is configured to provide approval of modified data in the transaction upon entry of a valid electronic signature. "SysSignID" is simply a naming convention for select parameter 1009. Parameter 1009 and its naming convention should remain consistent across all transactions or tables in which the electronic signature approval process is to be enabled. In another words, parameter 1009 is a controlling parameter in that upon entry of the "SysSignID", or other type of name, database log 208 is configured to log all changes to all fields within the particular table, such as the Work Center table, that includes select parameter 1009. At the point that select property 1008 is defined by the select parameter 1009, the foundation to use electronic signature in transaction 202 that corresponds with table 212 has been established.

Figure 12:
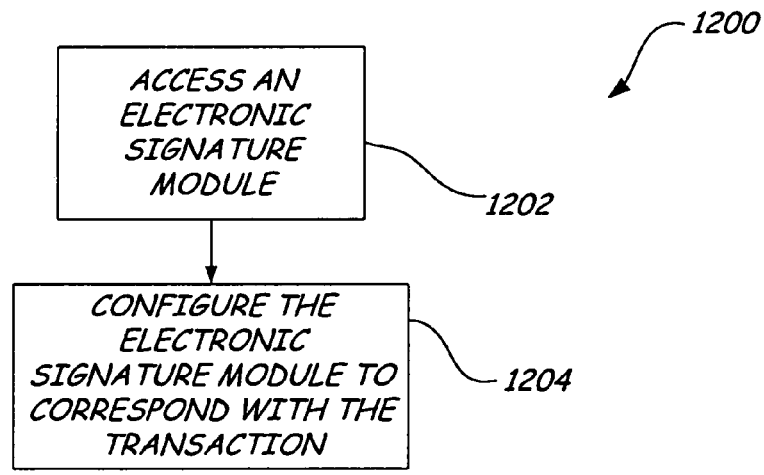
FIG. 12 is a flowchart illustrating a further method of enabling an electronic approval process in an ERP system in accordance with an embodiment of the present invention.

FIG. 12 is a flowchart 1200 illustrating further steps for enabling electronic signature approval after the foundation has been established in accordance with FIG. 9. At block 1202, electronic signature module 204 is accessed in response to a fourth user input. For example, the fourth user input could be the manipulation of a developmental tool in ERP system 200. At block 1204, electronic signature module 204 is configured to correspond with transaction 202 in response to a fifth user input. In order to configure electronic signature module 204 to correspond with transaction 202, the user applies code to the electronic signature module. The code is specific to the transaction. However, in many instances, the code is a generic code that needs very little modification from transaction type to transaction type in ERP system 200. The following example recites code that can be used to configure an electronic signature module to correspond with the example Work Center table:

```
SysSign sysSign;
;
sysSign = sysSign::construct( tableNum(WrkCtrTable),
    fieldNum(WrkCtrTable, SignatureModified));
if (!sysSign.Prompt ( ) )
{
    return;
}
if (wrkCtrTable.RecId &&
        sysSign.parmObjectStatus( ) ==
        sysSignObjectStatus::DialogFinishedOK)
{
    sysSign.SetSysSignId(wrkCtrTable);
    sysSign.finalize( );
}
super( );
if (sysSign && sysSign.parmObjectStatus( ) ==
sysSignObjectStatus::DialogFinishedOK))
{
    sysSign.setSysSignId(wrkCtrTable);
    wrkCtrTable.update( );
    wrkCenterTable_DS.reread( );
}
```

In another embodiment, enabling an electronic signature for approval of a transaction can require multiple electronic signatures. In such an embodiment, multiple signature fields are added for each required electronic signature. In addition, each signature field is configured with a select parameter, such as "SysSignID" in the "ExtendedDataType" field. Finally, electronic signature module 204 is configured to correspond with transaction 202 and therefore table 212, such that multiple signatures can be applied using different instances of an electronic signature form.

As discussed above in FIGS. 2-12 of the present invention, ERP system 200 (FIG. 2) is a multi-module software application. The ERP system 200 of the present invention includes a plurality of transactions 202. Each transaction 202 corresponds with a table 212. If an electronic signature approval process is to be enabled within a particular table, then the table includes a signature field having a property sheet. The property sheet includes properties that are defined by parameters. Basically the parameters define how the signature field functions. If an electronic signature approval process has been enabled for a specific transaction, then that transaction corresponds with an electronic signature module 204. The electronic signature module 204 validates an electronic signature by accessing a credentials module 206. The ERP system also logs modifications to a transaction in a database log 208 and also logs electronic signature approval attempts in a signature log 210.

In order to accomplish these various functions, ERP system 200 includes suitably programmed processing circuitry or suitably programmed storage circuitry that implements the various modules, such as a transaction, a table, an electronic signature module, a credentials module, a database log and a signature log. In addition, the programmed processing circuitry also controls the use of fields, property sheets and parameters in tables that correspond with transactions.

Although the present invention has been described with reference to particular embodiments, workers skilled in the art will recognize that changes may be made in form and detail without departing from the spirit and scope of the invention.

What is claimed is:

1. A non-signal computer readable medium having computer-executable instructions which, when executed by a computer, cause the computer to:

enable a user and a supervisor to require electronic signature approval for at least one of a plurality of transactions in an Enterprise Resource Planning (ERP) system table via a property sheet associated with the table, the requirement including definition of a select property associated with the at least one of the plurality of transactions configured to provide approval of the at least one of the plurality of transactions upon entry of a valid electronic signature, wherein the property sheet includes a list of properties associated with the electronic signature approval;

request a first username and password from the user by using an electronic signature form;

request a second username and password from the supervisor before allowing a modification to data in the at least one of the plurality of transactions by using an electronic signature form;

validate the first username and password;

log the validation of the first username and password in an electronic signature log as a successful validation if the first username and password are valid and as an unsuccessful validation if the first username and password are invalid;

repeat the validation process for the second username and password belonging to the supervisor in association with the at least one of the plurality of transactions;

write a signature identification (ID) on the at least one of the plurality of transactions that corresponds with the second username and password if the second username and password are valid;

log the validation of the second username and password in the electronic signature log as successful if the second username and password are valid and as an unsuccessful validation if the second username and password are invalid; and add an entry in the electronic signature log, the entry including a name of a computing device from which a second electronic signature approval was attempted, a signature user identification (ID) of an approver attempting electronic signature, a name of the approver, a date which the second electronic signature approval was attempted, a time which the second electronic signature approval was attempted and a description of the modification.

2. The non-signal computer readable medium of claim 1, wherein the computer-executable instructions further include causing the computer to abort the electronic approval process if one of the first and second username and password is not valid.

3. The non-signal computer readable medium of claim 1, the computer-executable instructions further include causing the computer to update the at least one of the plurality of transactions with the modified data if the second username and password are valid.

4. The non-signal computer readable medium of claim 1, the computer-executable instructions further include causing the computer to register the modified data in a database log if the second username and password are valid.

5. The non-signal computer readable medium of claim 4, wherein the computer-executable instructions further include causing the computer to add an entry in the database log, the entry viewable on an overview tab of the database log and including the name of the at least one of the plurality of transactions, a description of the modification, a type of the modification, a date of the modification, a time of the modification, a signature identification (ID) corresponding to the second username and password and a name of an approver that corresponds with the second username and password.

6. The non-signal computer readable medium of claim 5, wherein the entry in the database log comprises the entry viewable on a history tab and current data and previously registered data that was modified.

7. The non-signal computer readable medium of claim 1, wherein the entry in the signature log comprises a signature identification (ID) if the second username and password were validated.

8. A non-signal computer readable medium having computer-executable instructions which, when executed by a computer, cause the computer to:
- enable a user and a supervisor to require electronic signature approval for at least one of a plurality of transactions in an Enterprise Resource Planning (ERP) system table via a property sheet associated with the table, the requirement including definition of a select property associated with the transaction configured to provide approval of the at least one of the plurality of transactions upon entry of a valid electronic signature, wherein the property sheet includes a list of properties associated with the electronic signature approval;
- receive a modification to data in the at least one of the plurality of transactions from the user;
- request a first electronic signature the user;
- request a second electronic signature from the supervisor before making the modification to the data in the at least one of the plurality of transactions;
- provide an alert informing that the first valid electronic signature is as legally binding as a handwritten signature;
- validate the first electronic signature;
- log the validation of the first electronic signature in an electronic signature log as a successful validation if the first electronic signature is valid and as an unsuccessful validation if the first electronic signature is invalid;
- repeat the validation process for the second electronic signature belonging to the supervisor in association with the at least one of the plurality of transactions;
- write a signature identification (ID) on the at least one of the plurality of transactions that corresponds with the second validated electronic signature if the second electronic signature is valid;
- log the validation of the second electronic signature in the electronic signature log as a successful validation if the second electronic signature is valid and as an unsuccessful validation if the second electronic signature is invalid; and
- send a notification of the unsuccessful validation to the supervisor.

9. The non-signal computer readable medium of claim 8, wherein the computer-executable instructions which, when executed by a computer, cause the computer to receive the modification to data in the at least one of the plurality of transactions comprises computer-executable instructions which, when executed by a computer, cause the computer to receive an indication to change a capacity of a production resource and update the at least one of the plurality of transactions with the changed capacity if the second electronic signature is valid.

10. A computer system, comprising:
- a processor; and
- a memory having computer-executable instructions comprising:
  - enabling a user and a supervisor to require electronic signature approval through an electronic signature module for at least one of a plurality of transactions in an Enterprise Resource Planning (ERP) system table via a property sheet associated with the table, the requirement including definition of a select property associated with the at least one of the plurality of transactions configured to provide approval of the at least one of the plurality of transactions upon entry of a valid electronic signature, wherein the property sheet includes a list of properties associated with the electronic signature approval;
- the electronic signature module configured to:
  - request a first username and password from the user;
  - request a second username and password from the supervisor before allowing the modification to data in the at least one of the plurality of transactions; and
  - send a notification of an unsuccessful validation to the supervisor;
- a credentials module configured to validate the first and second username and password; and
- an electronic signature log configured to:
  - log the validation of the first and second username and password as one of a successful validation when the first and second username and password are valid;
  - write a signature identification (ID) on the at least one of the plurality of transactions that corresponds with the second username and password if the second username and password are valid; and
  - log the validation of the first and second username and password as an unsuccessful validation when the first and second username and password are invalid.

11. The computer system of claim 10, wherein the electronic signature module is configured to solicit the first and second username and password by using an electronic signature form.

12. The computer system of claim 10, further comprising a database log configured to register the modified data.

13. The computer system of claim 10, wherein the first and second username and password are also a first and second username and password for signing into an instance of the computer system.

14. The computer system of claim 10, wherein the electronic signature log includes an entry having information related to each electronic signature approval attempt.

* * * * *